(12) United States Patent
Mangano et al.

(10) Patent No.: US 10,579,561 B2
(45) Date of Patent: Mar. 3, 2020

(54) COMMUNICATION INTERFACE FOR INTERFACING A TRANSMISSION CIRCUIT WITH AN INTERCONNECTION NETWORK, AND CORRESPONDING SYSTEM AND INTEGRATED CIRCUIT

(71) Applicant: STMICROELECTRONICS S.R.L., Agrate Brianza (IT)

(72) Inventors: Daniele Mangano, San Gregorio di Catania (IT); Mirko Dondini, Catania (IT); Salvatore Pisasale, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 114 days.

(21) Appl. No.: 15/940,650

(22) Filed: Mar. 29, 2018

(65) Prior Publication Data
US 2018/0217952 A1 Aug. 2, 2018

Related U.S. Application Data

(60) Division of application No. 14/841,522, filed on Aug. 31, 2015, now Pat. No. 9,959,226, which is a
(Continued)

(30) Foreign Application Priority Data

May 31, 2013 (IT) .............................. TO2013A0444

(51) Int. Cl.
*G06F 13/28* (2006.01)
*G06F 12/08* (2016.01)
(Continued)

(52) U.S. Cl.
CPC .............. *G06F 13/28* (2013.01); *G06F 3/067* (2013.01); *G06F 3/0619* (2013.01);
(Continued)

(58) Field of Classification Search
None
See application file for complete search history.

(56) References Cited

U.S. PATENT DOCUMENTS 6,971,050 B1 * 11/2005 Ohbuchi ........... H03M 13/2703
714/701
7,349,330 B1   3/2008 Hayakawa et al.
(Continued)

FOREIGN PATENT DOCUMENTS

EP       2405362 A1    1/2012

OTHER PUBLICATIONS

Italian Search Report, dated Nov. 27, 2013, for Italian Application No. TO20130444, 2 pages.
(Continued)

*Primary Examiner* — Natisha D Cox
(74) *Attorney, Agent, or Firm* — Seed Intellectual Property Law Group LLP

(57) ABSTRACT

A communication interface couples a transmission circuit with an interconnection network. The transmission circuit requests transmission of a predetermined amount of data. The communication interface receives data segments from the transmission circuit, stores the data segments in a memory, and verifies whether the memory contains the predetermined amount of data. When the memory contains the predetermined amount of data, the communication interface starts transmission of the data stored in the memory. Alternatively, when the memory contains an amount of data less than the predetermined amount of data, the communication interface determines a parameter that identifies the time that has elapsed since the transmission request or the first datum was received from the aforesaid transmission circuit, and verifies whether the time elapsed exceeds a time threshold. In the case where the time elapsed exceeds the time threshold, the communication interface starts transmission of the data stored in the memory.

20 Claims, 7 Drawing Sheets

Related U.S. Application Data continuation-in-part of application No. PCT/IB2014/061839, filed on May 30, 2014.

(51) Int. Cl.
*G06F 13/40* (2006.01)
*G06F 3/06* (2006.01)

(52) U.S. Cl.
CPC ........ *G06F 3/0655* (2013.01); *G06F 13/4059* (2013.01); *G06F 2213/0038* (2013.01)

(56) References Cited

U.S. PATENT DOCUMENTS

| | | |
|---|---|---|
| 8,855,184 B2 * | 10/2014 | Suh ................ H04L 1/0054 375/231 |
| 2001/0001616 A1 | 5/2001 | Rakib et al. |
| 2005/0172091 A1 | 8/2005 | Rotithor et al. |
| 2011/0225367 A1 * | 9/2011 | Rajvanshy .......... G06F 12/0866 711/118 |
| 2013/0044745 A1 | 2/2013 | Imamura |
| 2013/0138830 A1 | 5/2013 | Fang |
| 2013/0321144 A1 * | 12/2013 | Shuster ................ G06F 1/1684 340/522 |
| 2013/0324144 A1 | 12/2013 | Warken |
| 2015/0282083 A1 | 10/2015 | Jeong et al. |
| 2015/0370734 A1 * | 12/2015 | Mangano ............. G06F 3/0619 709/212 |

OTHER PUBLICATIONS

International Search Report, dated Jul. 30, 2014, for PCT Application No. PCT/IB2014/061839, 3 pages.

* cited by examiner

COMMUNICATION INTERFACE FOR INTERFACING A TRANSMISSION CIRCUIT WITH AN INTERCONNECTION NETWORK, AND CORRESPONDING SYSTEM AND INTEGRATED CIRCUIT

BACKGROUND

Technical Field

The present disclosure relates to a communication interface for interfacing a transmission circuit with an interconnection network. Embodiments have been developed with particular attention paid to possible use in communication interfaces that are typically used for transmission of the DMA (Direct Memory Access) type.

Description of the Related Art

Systems within an integrated circuit (Systems-on-Chip—SoCs) and systems in a single package (Systems-in-Package—SiPs) typically comprise a plurality of circuits that communicate with one another via a shared communication channel. For instance, the aforesaid communication channel may be a bus or a communication network, such as for example a Network-On-Chip (NoC) or Network-in-Package (NiP), and is frequently referred to as "interconnection network" (ICN).

For instance, the above SoCs are frequently used for processors designed for mobile or multimedia applications, such as for example smartphones, set-top boxes, or routers for domestic uses.

FIG. 1 shows an example of a typical SoC 1.

In the example considered, the system comprises a processor 10 and one or more memories 20. For instance, illustrated in the example considered are a small internal memory 20a, such as for example a RAM (Random-Access Memory), a non-volatile memory 20b, such as for example a flash memory, and a communication interface 20c for an external memory, such as for example a DDR memory.

In the example considered, the system also comprises interface circuits 30, such as for example input and output (I/O) ports, a UART (Universal Asynchronous Receiver-Transmitter) interface, an SPI (Serial Peripheral Interface) interface, a USB (Universal Serial Bus) interface, and/or other digital and/or analog communication interfaces.

In the example considered, the system also comprises further peripherals 40, such as for example comparators, timers, analog-to-digital or digital-to-analog converters, etc.

In the example considered, the aforesaid modules, i.e., blocks 10, 20, 30 and 40, are connected together through a communication channel 70, i.e., an interconnection network, such as for example a bus or preferably a Network-On-Chip (NoC).

The general architecture described previously is frequently used for conventional micro-controllers, which renders any detailed description here superfluous. Basically, this architecture enables interfacing of the processor 10 with the various blocks 20, 30 and 40 via software commands that are executed by means of the processor 10.

In multimedia or mobile processors other blocks 50 are added to the above generic architecture, which will be referred to hereinafter as Intellectual Property (IP) circuits. For instance, the aforesaid IP blocks 50 may comprise an image or video encoder or decoder 50a, an encoder or decoder of audio signals 50b, a WiFi communication interface 50c, or in general blocks, the hardware structure of which is optimized for implementation of functions that depend upon the particular application of the system. The aforesaid blocks may even be autonomous and interface directly with the other blocks of the system, for example the memories 20 and the other peripherals 30 and 40.

Typically, associated to each IP block 50 is a respective communication interface 80 configured for exchanging data between the IP block 50 and the communication channel 70.

For instance, FIG. 2 shows a block diagram of a typical communication interface 80 for an IP block 50.

In the example considered, the communication interface 80 comprises:
  a transmission memory 802a for temporary saving output data, i.e., the data coming from the respective IP block 50;
  a reception memory 802b for temporary saving input data, i.e., the data coming from the communication channel 70;
  an interface 804 for exchanging data between the memories 802a, 802b and the communication channel 70, for example for sending the data saved in the transmission memory 802a to the communication channel 70 and saving the data received from the communication channel 70 in the reception memory 802b; and
  a control circuit 806, which, for example, controls the flow of data between the IP block 50 and the communication channel 70, monitors the state of the memories 802a and 802b, and generates the control signals for the IP block 50.

Typically, the reception memory 802b is a FIFO (First-In/First-Out) memory. However, in the case where the data received may be out of order, the reception memory 802b or the interface 804 may also re-order the data before they are written in the reception memory 802b.

In the example considered, no interface is illustrated for exchange data between the IP block 50 and the memories 802a and 802b, because typically the IP block 50 is able to exchange the data directly with the memories 802a and 802b, for example by exploiting the control signals generated by the control circuit 806.

For instance, FIGS. 3a and 3b show a scenario of a typical data flow. In particular, FIG. 3a is a block diagram that shows the data flow of a typical transmission of data, and FIG. 3b is a flowchart that shows the respective transmission steps.

After an initial step 1000, the processor 10 sends, in a step 1002, an instruction to the block 50a indicating that the memory 20a contains data for the block 50a. For instance, for this purpose, the processor 10 may send to the block 50a an instruction indicating a start address and an end address within the memory 20a (or else a start address and the length of the transfer). Alternatively, the processor 10 could configure the aforesaid area by writing the start address and the end address directly in a configuration register of the block 50.

Next, in a step 1004, the block 50a reads the data from the memory 20a by means of the respective communication interface 80a. In particular, typically, the communication interface 80a sends for this purpose to the memory 20a a read request, and the memory sends to the communication interface 80a the data requested. For instance, typically both the read request and the response are sent through the interconnection network 70 via data packets.

Finally, once all the data have been read, the block 50a or the communication interface 80a generates, in a step 1006, an interrupt that signals to the processor 10 the fact that the transmission has been completed.

Next, the processor 10 can allocate, in a step 1008, the respective area of the memory 20a to another process, and the procedure terminates in a step 1010.

Consequently, typically the blocks 50 access the memory 20 by means of a Direct Memory Access (DMA), i.e., the blocks 50 access the memory directly without any intervention on the part of the processor 10.

Typically, the aforesaid DMAs may be of two types: a data-write request or a data-read request. The read and write DMA transfers are substantially identical except for the data:
in the case of a write request, the data are sent by the IP block 50 that has requested the DMA; and
in the case of a read request, the data are sent by the destination block that receives the read request.

Both of the requests are typically characterized either by a start address and an end address from which data is to be read/written or by a start address and a length of the transfer.

For instance, the above address can comprise the address of a node of a NoC, the memory address within the destination (for example, in the case of a memory), or a combination of both. Consequently, both the write requests and the read requests are typically accompanied by a start address that identifies the addressee of the request, and the aforesaid address may belong to the memory map of the system. In this case, the interconnection system 70 decodes the address received and identifies the addressee that is to receive or supply the data and conveys appropriately the replies that it receives from the addressee to the source of the communication.

Furthermore, the various blocks of the system 1 may also simultaneously access the interconnection network 70.

For instance, the blocks 10 and 50 are typically the communication sources (initiators), which request DMA transfers (both writing and reading transfers) in competition with one another, where each could even present a plurality of channels. Instead, the blocks 20, 30 and 40 are typically addressees, which receive or send data in accordance with the requests.

For this reason, there may exist simultaneously a number of DMA communication channels, which, once converted into the protocol of the interconnection network 70, are to be transmitted through the network 70 itself.

FIG. 4 shows an example of a typical solution that can be used for transmission of a plurality of DMA communications coming from respective circuits designated as a whole by 90. For instance, the circuits 90 may be the processor 10 and/or an IP block that sends a data-read request or a data-write request.

Typically, each transmission circuit 90 has associated to it an interface circuit 92 that converts the DMA transmission coming from the respective circuit 90 into a communication that uses the protocol of the interconnection network 70; i.e., the interface 92 makes a conversion between the transport layer and the link layer. For instance, the blocks 10-40 are typically optimized for a given architecture, and the interface 92 is directly integrated in the respective block. Instead, the IP blocks 50 are typically not optimized for a specific communication protocol, and consequently an additional interface is frequently required (see, for example, the blocks 80 in FIG. 1 or FIG. 3a). For instance, as mentioned previously, the interface 92 could segment the DMA communication and add respective headers for forming data packets that can be forwarded to the destination through the interconnection network 70.

Frequently, different circuits 92 have to transmit data simultaneously. For this reason, the interconnection network 70 typically has associated a circuit 94 that regulates access to the interconnection network 70, which is typically referred to as arbiter, planner, or scheduler. For this reason, the interface circuit 92 typically comprises a memory (see FIG. 2) for temporarily saving the data coming from the respective circuit to render the operation of the respective circuit 90 independent of possible delays in the transmission of the data over the interconnection network 70.

Typically, the arbiter 94 is directly integrated in the interconnection network 70 and could be, for example, a router node of a NoC. In fact, in general, in the solution illustrated in FIG. 4, also the arbiter 94 uses the protocol of the interconnection network 70 and can, for example, analyze the header of the various packets for determining the priority of the transmissions in such a way as to guarantee a certain quality of service (QoS).

Consequently, in general, different transmission circuits 90 may send to one and the same memory 20 read requests and/or write requests that are interleaved.

However, the aforesaid type of access may cause problems when the memory 20 comprises a plurality of memory pages, for example when the memory 20 is a DDR memory.

In this context, FIG. 5 shows a typical memory 20.

In the example considered, the aforesaid memory 20 comprises a physical memory 202 that may also comprise a plurality of memory blocks and a memory-control circuit 204 that handles the accesses to the physical memory 202.

For instance, in the case where the memory 202 is a DDR memory, the memory is structured in different memory rows, or memory pages. In fact, as envisaged by the operation of DDR memories, to access a new memory row the so-called operation of "row precharge" must be carried out. The aforesaid operation typically requires various clock cycles, the so-called "Row Precharge Time", which depends upon the particular DDR memory used.

Consequently, the physical memory 202 may comprise physical memory pages P1 . . . Pn, where the access to a new memory page requires additional access time.

In general, organization of the memory in memory pages may even be just virtual. For instance, to speed up accesses to the physical memory 202, the memory-control circuit 204 may have associated to it a cache memory 206 that has a smaller capacity than the memory 202. In this case, the entire memory area of the memory 202 is virtually divided into blocks P1 . . . Pn, which have the same size as the cache memory 206. In this case, when access to a given memory location within a page is requested, not just the datum requested is loaded, but the entire page to which the datum belongs. Consequently, when reading of a datum is requested, this datum is first sought in the cache memory 206. In the case where the datum is present, the so-called "page hit", the copy present in the cache memory 206 is used. Instead, when the datum is not present, the so-called "page miss", the entire memory page associated to the aforesaid datum is retrieved and stored in the cache memory 206. In some cases, the cache memory also supports write requests. For instance, in this case, before a new memory page is loaded, the previous page present in the cache memory 206 is written again in the memory 202.

Consequently, regardless of whether the organization of the memory 20 in memory pages P1 . . . Pn is due to the physical organization of the memory (for example, the rows of a DDR memory) and/or to the virtual organization of the memory (for example, the use of a cache memory), read requests and/or write requests that access memory addresses that do not correspond to the current memory page are much slower.

However, as mentioned previously, the read requests and write requests may also come from different circuits and consequently be addressed to completely different memory addresses, which may cause continuous changes of memory page.

For instance, for this reason, memory controllers 204 are known that are able to receive a plurality of read and/or write requests and that first re-order the requests in such a way as to minimize the changes of the memory pages.

Furthermore, also the transmission circuits 90 may optimize accesses to the memory 20. For instance, a circuit, such as for example a circuit 50 that sends data of a write request or a memory 20 that sends the data in response to a read request, can group together the data that correspond to consecutive addresses in the memory 20 in a single transaction, the so-called "chunks" or "bursts", and the interconnection network 70 can consider the aforesaid "chunks" as a single message that must not be interrupted via arbitration. For instance, typically the aforesaid type of communication is referred to as "Store and Forward" (S&F). For instance, typically communication interfaces 92 store for this purpose the entire chunk and send it to the interconnection network 70 only when all the data have been received. Instead, the various nodes of the network 70 do not necessarily have to implement the S&F mechanism, but must perform a chunk-based arbitration, i.e., an arbitration that guarantees the atomicity of the chunk.

The inventors have noted that the aforesaid type of communication adds further latencies, because the interfaces 90 can send the messages only when all the data have been received. Furthermore, additional memory space is required for storing the data of a chunk.

BRIEF SUMMARY

Embodiment of the present disclosure provide solutions that will overcome one or more of the drawbacks outlined above.

With a view to achieving the aforesaid object, the subject of the disclosure is a communication interface having the characteristics specified in the claims. The disclosure also regards a corresponding system and integrated circuit.

The claims form part of the technical teaching provided herein in relation to the disclosure.

As mentioned previously, the present description regards a new communication interface for interfacing a transmission circuit with an interconnection network. In particular, the transmission circuit requests, via a transmission request, transmission of a predetermined amount of data.

In various embodiments, the communication interface receives from the transmission circuit data segments, for example data packets that belong to a chunk. Next, the communication interface stores the data segments in a memory and verifies whether the memory contains all the data of the transmission, i.e., the memory contains the amount of data to be transmitted.

In various embodiments, in the case where the memory contains all the data, the communication interface starts transmission of the data.

In various embodiments, the memory can start transmission even before, i.e., in the case where not all the data have yet been received, provided that certain criteria are satisfied.

For instance, in various embodiments, the communication interface determines a parameter that identifies the time that has elapsed since the transmission request or the first datum received and verifies whether the time elapsed exceeds a time threshold. In the case where the time elapsed exceeds the time threshold, the communication interface starts transmission of the data immediately.

For instance, in various embodiments, the communication interface for this purpose sends the data as data segments of a chunk, where the data segments comprise an identifier that signals to the interconnection network the fact that the transmission of the data segments must not be interrupted via interleaving with transmission segments coming from other circuit.

In various embodiments, also other start-up criteria may be envisaged. For instance, in various embodiments, the communication interface starts transmission in the case where a given number of data has been received, i.e., in the case where the memory contains an amount of data that is greater than a data threshold.

In various embodiments, the communication interface stops transmission of the data segments when all the data have been transmitted or when the memory is empty.

In various embodiments, the communication interface stops transmission of the data segments also in the case where the destination of the communication is a memory with a plurality of memory pages and the next transmission segment contains data that are to be written in a memory address that belongs to a different memory page.

In various embodiments, the time threshold and/or the data threshold is determined as a function of the bandwidth for writing of data in the memory, of the bandwidth for transmission over the interconnection network, and of the amount of data that are to be transmitted.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. Various embodiments will now be described purely by way of non-limiting examples with reference to the annexed drawings, wherein.

DETAILED DESCRIPTION

In the ensuing description, various specific details are illustrated, aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in different points of the present description do not necessarily refer to one and the same embodiment. Furthermore, particular conformations, structures, or characteristics may be combined in any adequate way in one or more embodiments.

The references used herein are provided merely for convenience and hence do not define the sphere of protection or the scope of the embodiments.

As mentioned previously, the present disclosure provides solutions that will enable transmission of data over an interconnection network 701, efficiently and at a low cost. Consequently, the solutions described herein may be used in the systems described previously with reference to FIGS. 1 to 5.

Basically, also the transactions of the present description are based upon transactions of the "chunk" or "burst" type, i.e., transactions in which a plurality of data are transmitted consecutively without interleaving with data coming from other circuits.

Figure 13:
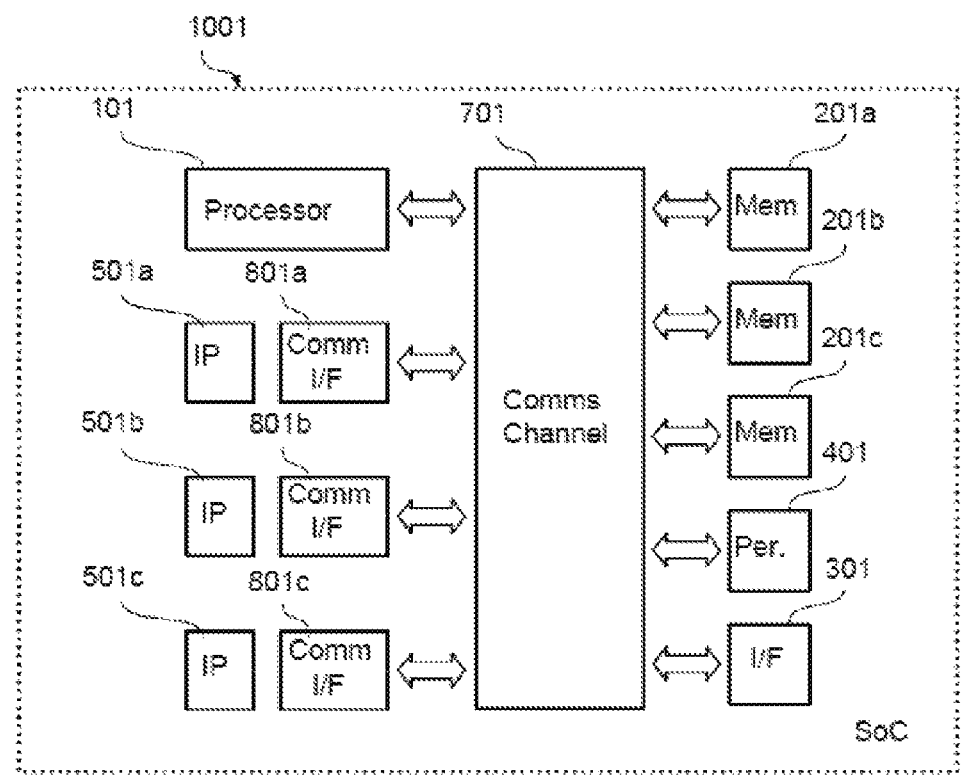

In particular, the inventors have noted that the generation of the aforesaid chunks is important in the communication interface 801 that interfaces an IP block 501 with the interconnection network 701 as seen, for example, in FIG. 13. For instance, there may exist situations in which the respective IP block 501*a*-501*c* does not supply continuously the data of a transaction, or the number of datums may be too high. Similar problems may also exist for the communication interfaces of the memories 201*a*-201*c*, or for any communication interface 921 configured for interfacing a transmission circuit 901 with the interconnection network 701 (see, for example, FIGS. 8, 9, and 13).

For instance, typically the data are transmitted through the interconnection network 701 as transmission segments, and the transmission segments that belong to a certain chunk are identified via an identifier, such as for example a flag. For instance, in the case where the interconnection network 701 is based upon an AMBA AXI bus or STBus, the segments of a chunk are identified with a dedicated-control signal. Instead, in the case where the interconnection network 701 is based upon a NoC, typically each transaction comprises a header, and the fact that it belongs to a chunk is highlighted directly in the header.

For instance, in various embodiments, the data that are to be exchanged between an initiator or a source of a communication and a destination of the communication (target) comprise a header for transporting control information (for example, the identifier of the destination, the type of operation, and so forth) and a payload for transporting the effective data involved in the operation.

In various embodiments, both the header and the payload are transmitted to the data-link layer in amounts referred to as "flits" (flow control units).

Figure 1:
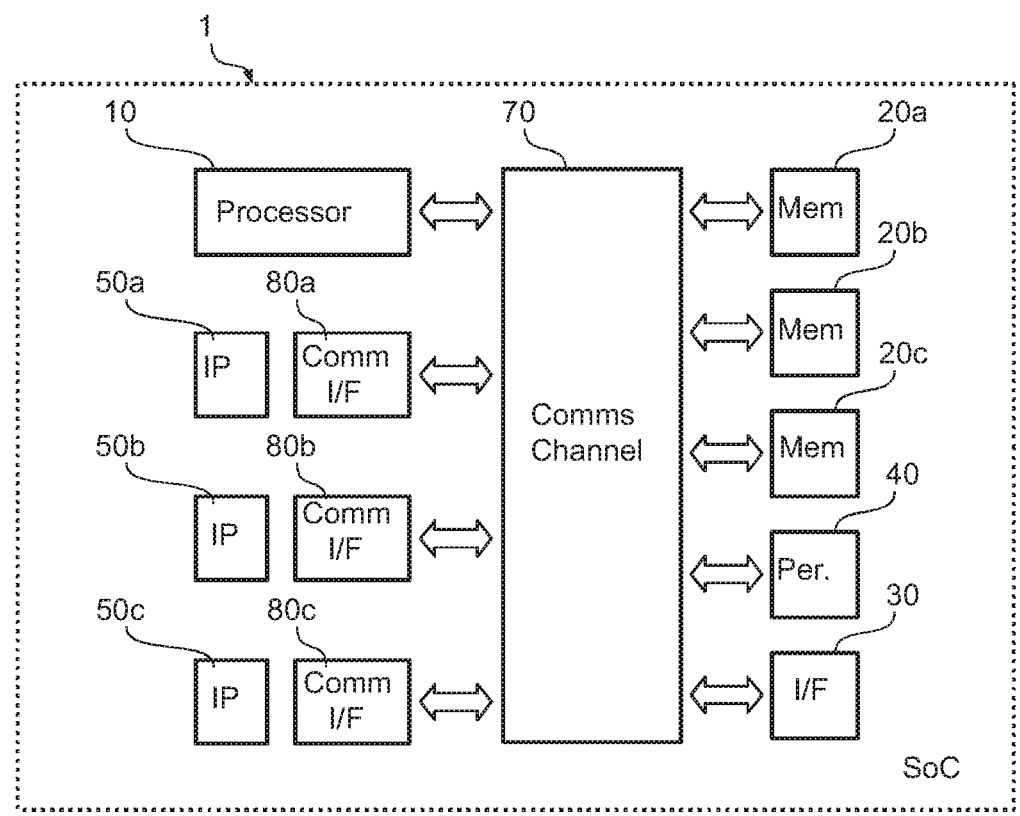
FIGS. 1 to 5, which illustrate conventional SoC structures, have already been described previously.
Figure 2:
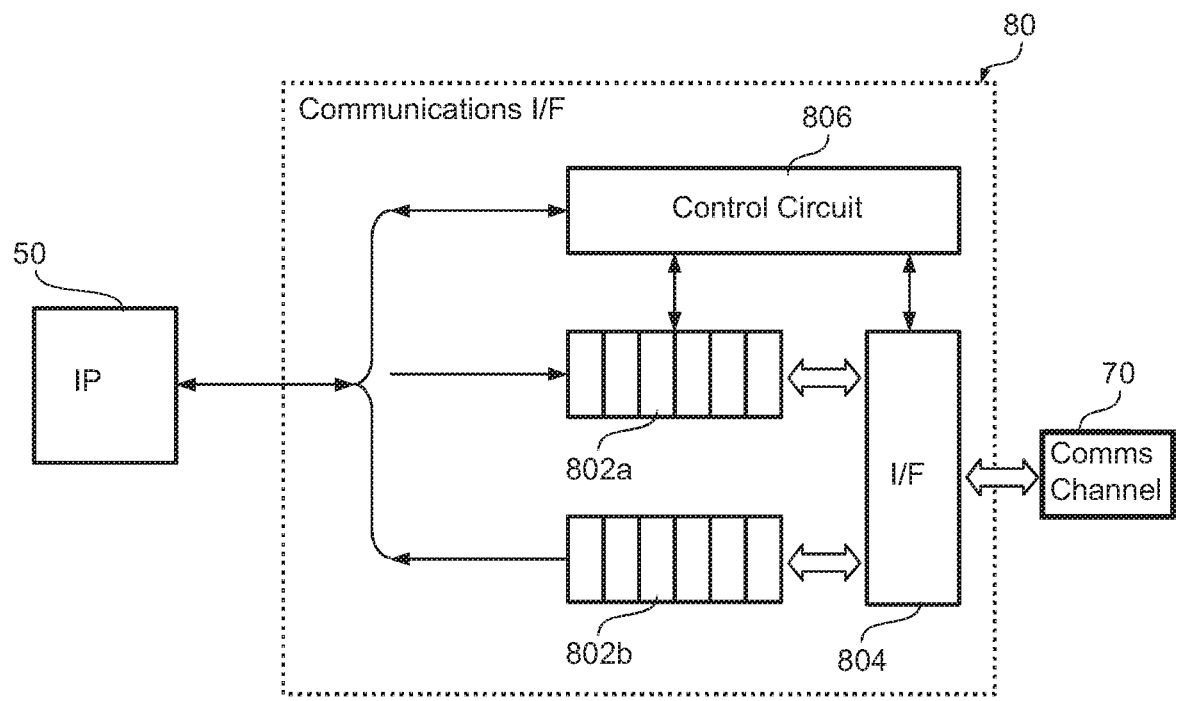
Figure 3A:
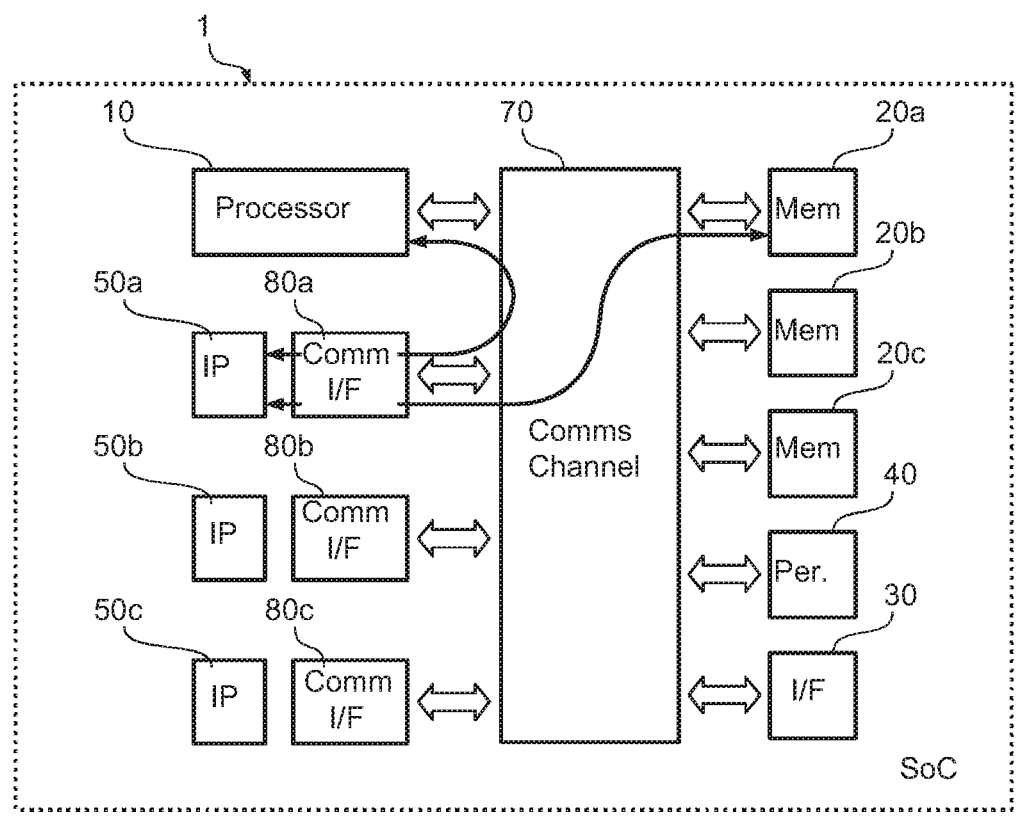
Figure 3B:
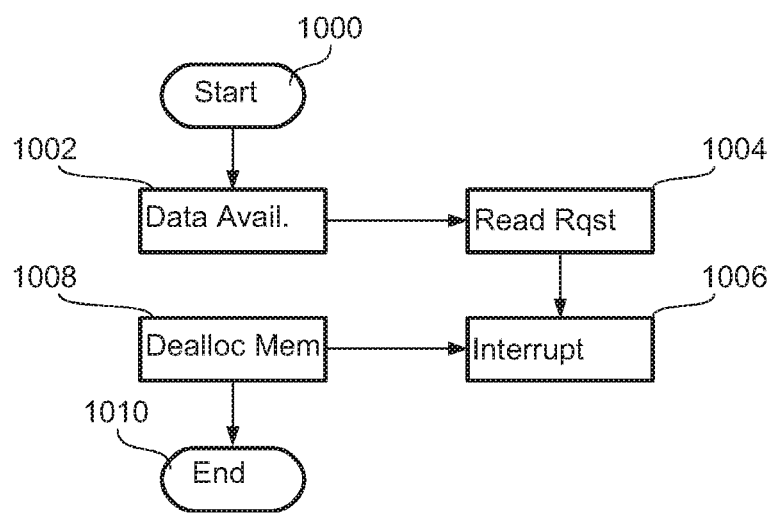
Figure 4:
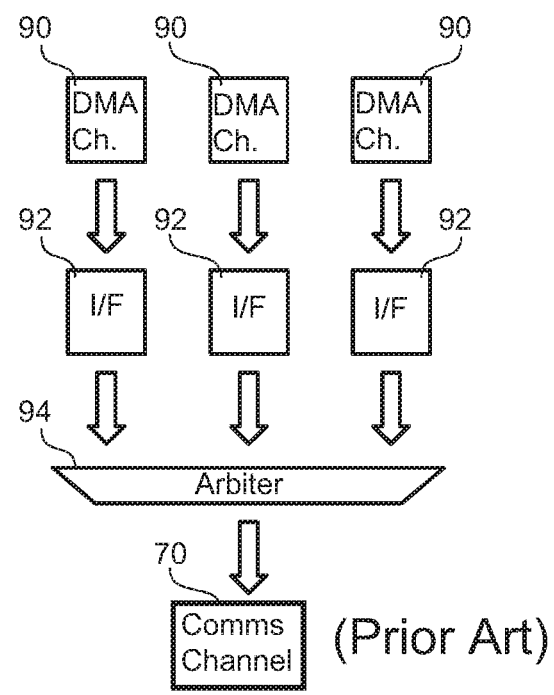
Figure 5:
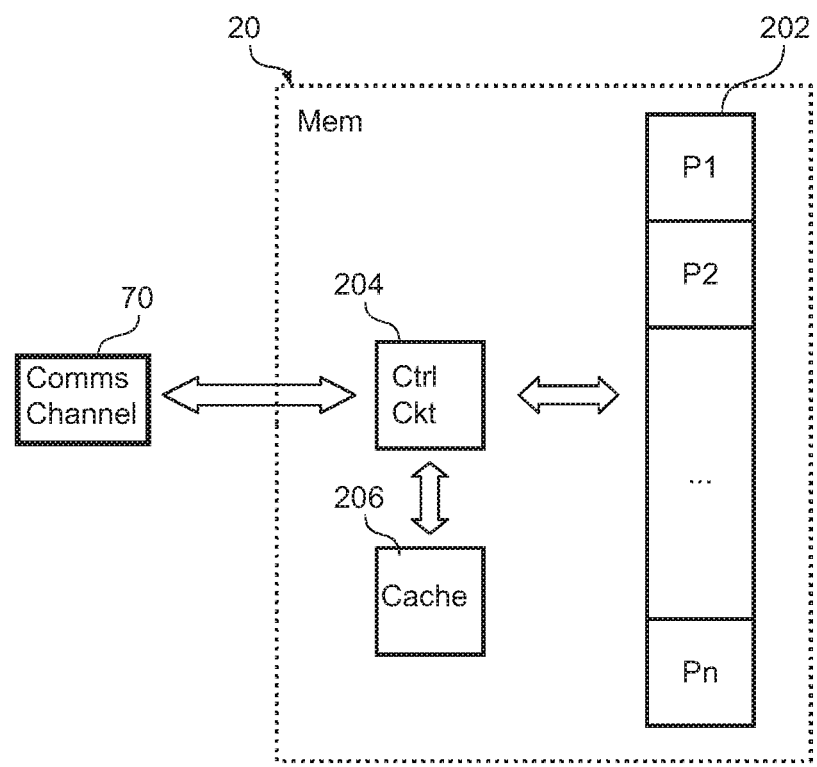
Figure 6:
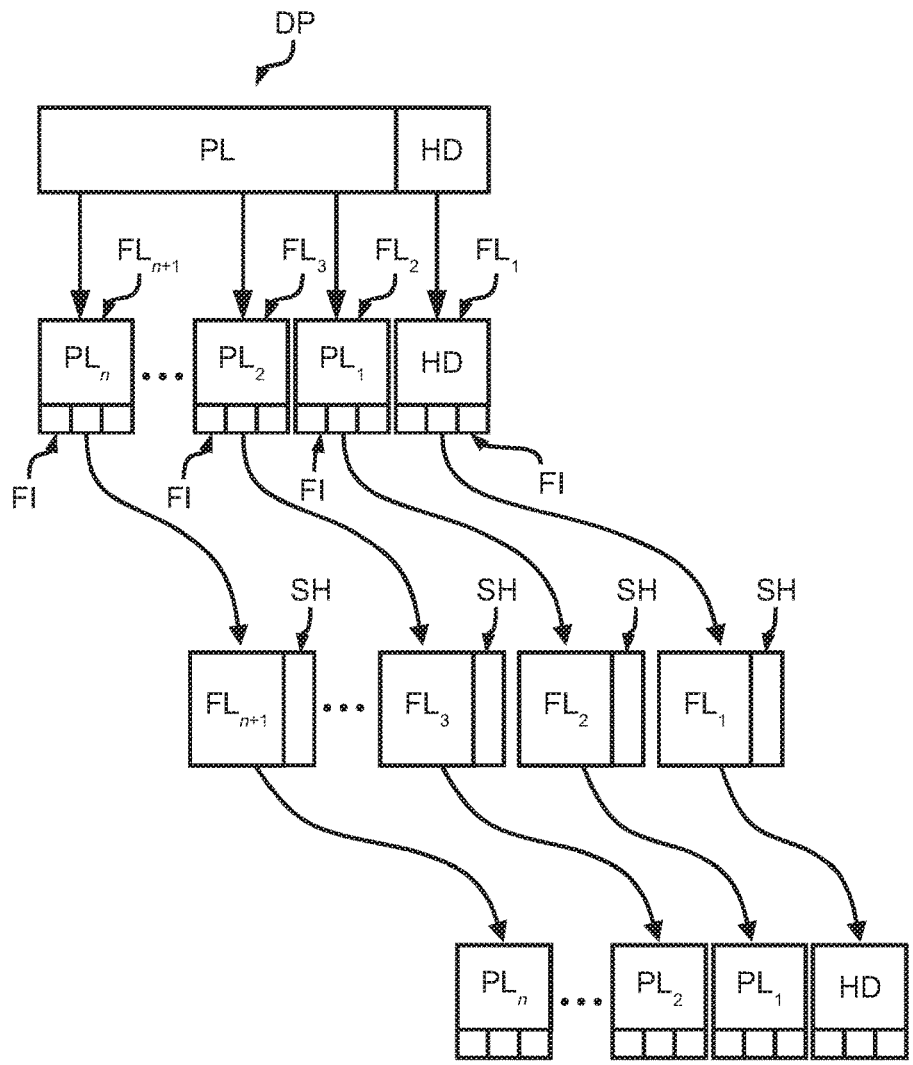
FIGS. 6 to 13 show various details of a communication interface according to the present description.

For instance, FIG. 6 shows an embodiment in which a data packets DP is transmitted comprising a header HD and a payload PL.

In the embodiment considered, the data packet DP is divided into a plurality of flits. For instance, in the embodiment considered, the first flit $FL_1$ comprises the header HD, while the payload PL is divided into a plurality of packets $PL_1, PL_2, \ldots, PL_n$ that are transported by a plurality of flits $FL_2, FL_3, \ldots, FL_{n+1}$. The flits may also comprise other information FI, for example:
 a flit identifier "flit_id" that enables identification of the start and end of a transaction; and/or
 an interface signal that identifies the type of the transaction, for example, "package" for a single data packet, or "chunk" or "message" for more complex transactions that include a plurality of packets.

In the embodiment considered, each flit is transmitted by means of a transmission segment. For instance, in the embodiment considered, the aforesaid transmission segments comprise a segment header SH and the respective flit as payload.

In the embodiment considered, the aforesaid segments are transmitted by the initiator to the destination through the interconnection network 701. The communication interface of the destination receives the single segments and re-assembles the original packet.

Figure 7:
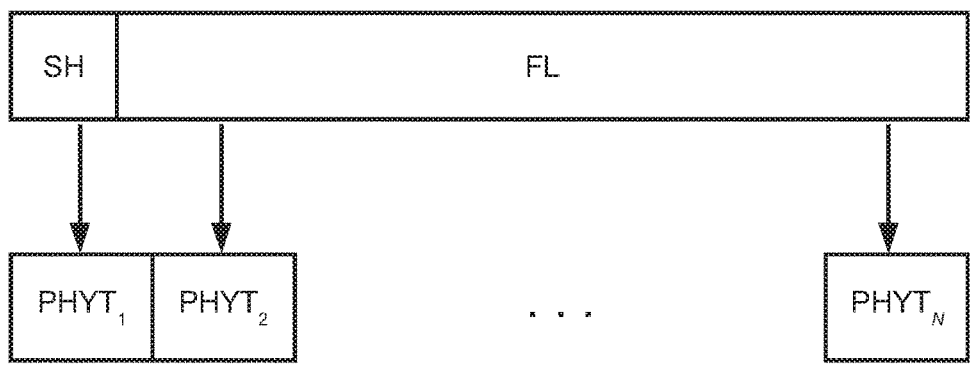

FIG. 7 shows that the aforesaid transmission segments can be fragmented further into physical units (PHYTs) $PHYT_1, PHYT_2, \ldots, PHYT_N$ for transmission on the physical channels. In fact, this embodiment is useful if the size of the physical units is smaller than the size of the transmission segment.

Consequently, for the example considered, a chunk would comprise a plurality of packets DP, i.e., the smallest unit of communication that cannot be interrupted by the arbitration at the network level. In fact, for the example illustrated in FIGS. 6 and 7, the transmission of a packet DP should not be interrupted in so far as the control information is transported through the header HD of the packet DP.

Consequently, in various embodiments, the communication interface according to the present description is configured for receiving from the respective transmission circuit information that enables identification of the destination of the communication, for example the header HD illustrated in FIG. 6, and a plurality of data, for example the payload PL illustrated in FIG. 6. Next, the communication interface is responsible for transmission of the aforesaid information and data to the interconnection network 701 as data segments that belong to a chunk, i.e., a transmission that comprises an identifier that signals to the interconnection network 701 that the aforesaid transmission of consecutive transmission segments should not be interrupted via arbitration and/or interleaving with transmission segments coming from other circuits. For instance, for this purpose the communication interface may generate the flits and possibly the smaller physical units.

Consequently, in various embodiments, the transmission circuit can request transmission of a certain number of data that are to be transmitted as chunks.

According to the "Store and Forward" (S&F) approach the communication interface should wait for all the data to be received and generate the chunk only when all the data have been received. Instead, according to the present description, the communication interface does not necessarily wait for all data to be received, but can start generation of a chunk even before. In various embodiments, the remaining data are next sent with one or more further chunks.

Figure 8:
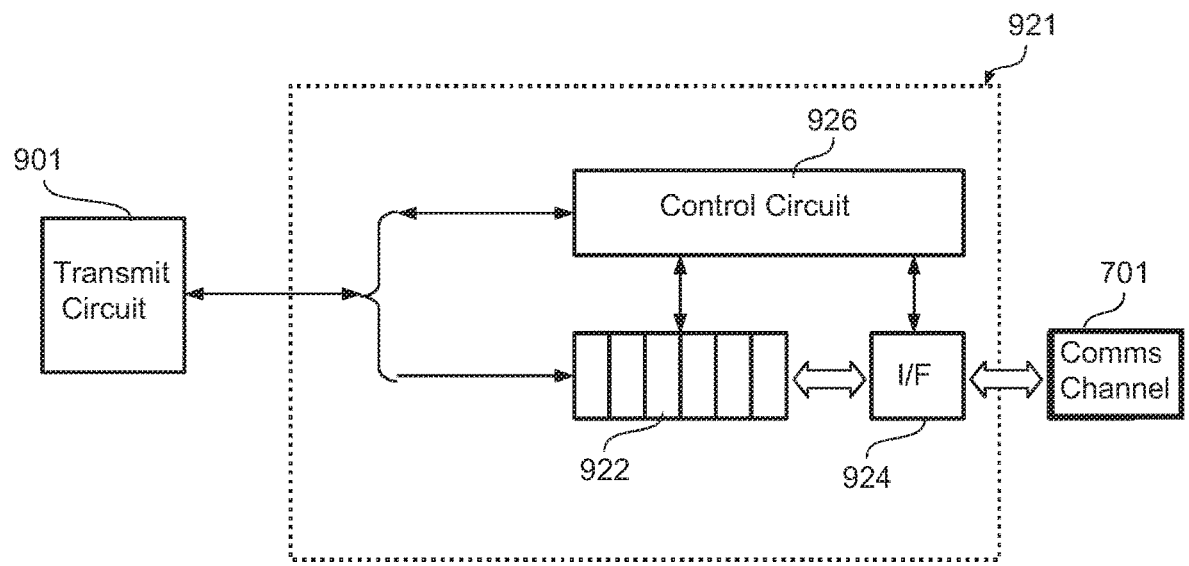

For instance, FIG. 8 shows a possible embodiment of a communication interface 921 according to the present description. In particular, FIG. 8 shows only the part of the transmission, but the communication interface 921 could also handle reception of data coming from the interconnection network 701.

In the embodiment considered, the aforesaid communication interface 921 is configured for receiving data from a transmission circuit 901, such as for example the processor 1001, a memory 201, or preferably an IP block 501 (FIG. 13).

In the embodiment considered, the communication interface 921 comprises at least:
 a transmission memory 922, such as for example a FIFO (First-In/First-Out) memory, for temporary saving of the data coming from the respective transmission circuit 901;

an interface 924 for sending the data saved in the transmission memory 922 to the communication channel 701; and a control circuit 926, which, for example, controls the flow of data between the circuit 901 and the communication channel 701, monitors the state of the memories 922, and generates the control signals for the transmission circuit 901.

In the embodiment considered, no interface is illustrated for exchange of data between the transmission circuit 901 and the memories 922 because typically the circuit 901 is able to save the data directly in the memories 922, for example by exploiting the control signals generated by the control circuit 926. For instance, in one embodiment, the transmission circuit 901 could save the transmission segments SH or the flits FL illustrated in FIG. 6 directly in the memory 922.

However, also an interface could be provided for receiving the data from the transmission circuit 901 and for saving the aforesaid data in the transmission memory 922. For instance, in one embodiment, the transmission circuit 901 could send even just the data packet DP illustrated in FIG. 6.

Consequently, in general, the communication interface 921 is configured for receiving information that enables identification of the destination of the communication and the data to be sent.

Figure 9:
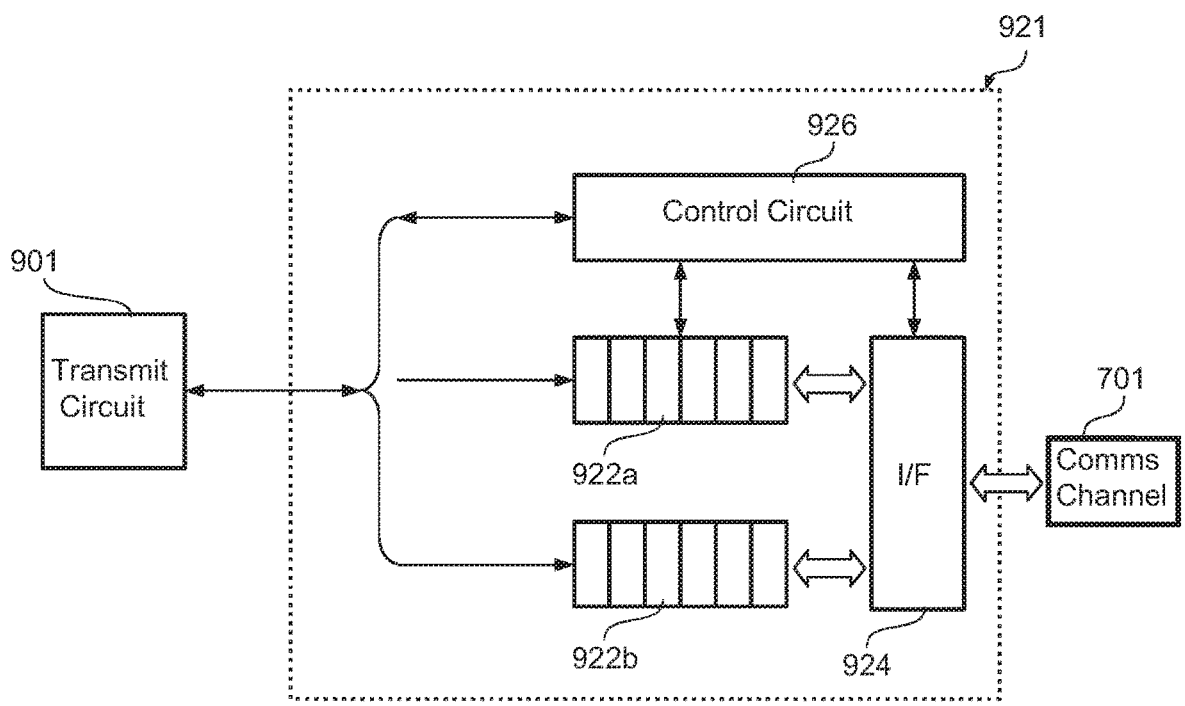

FIG. 9 shows in this context an embodiment that is particularly useful in the transmission system described with reference to FIG. 6.

In particular, in the embodiment considered, the communication interface 921 comprises two FIFO memories 922a and 922b:

stored in the first FIFO memory 922a is the control information, such as for example the headers HD of the data packets DP illustrated in FIG. 6; and stored in the second FIFO memory 922b are the data, such as for example the payload PL of the data packets DP illustrated in FIG. 6.

In various embodiments, a chunk is sent when one of the following events is detected:

the communication interface has received a number of datums that corresponds to the number of datums that are to be transmitted; or the communication interface has received a lower number of datums and at least one of the following conditions has been met:

a) a wait time, i.e., a time threshold, has been reached or exceeded; and/or b) a maximum number of datums, i.e., a data threshold has been reached or exceeded.

In various embodiments, the time threshold and/or the data threshold are configurable. For instance, the aforesaid thresholds may be stored in at least one configuration register that can be written, for example, via software-code instructions that are executed by means of the processor 1001.

For instance, in one embodiment, the following parameters may be set:

the number of datums CS, for example the number of packets DP, that belong to the chunk;

the time threshold OT, which is identified, for example, via a maximum number of clock cycles; and the data threshold THR.

In particular, the data threshold THR is useful when the memory 922 has a small size, and consequently this parameter is optional.

In various embodiments, the data dimensions, i.e., the parameters CS and THR, are expressed in bytes or preferably in a number of transmission segments.

In various embodiments, the transmission of the chunk is stopped when one of the following events is detected:

the transmission memory 922 is empty; or a number of transmission segments equal to the number of datums CS that belong to the chunk have been transmitted.

In general, the number of datums that belong to a chunk could be specified also directly in the first transmission segment, for example in the header HD. Consequently, the aforesaid datum could be modified and indicate the datums that are available in the memory 922 when transmission of the chunk is set under way. However, this solution does not take into consideration that during transmission of the chunk further data can be received.

Consequently, in a preferred embodiment, the fact that a transmission segment belongs to a chunk is indicated only via a flag, such as for example a control-signal bit FL.

For instance, the aforesaid flag can be set at a first logic value, such as for example "1", for the first transmission segment of the chunk and for the subsequent transmission segments, and at a second logic value, such as for example "0", for the last transmission segment.

Consequently, in the case where sending of the chunk has been set under way following upon detection of exceeding of the time threshold and/or data threshold, the communication interface 921 could still receive other data that are transmitted with the chunk until the memory is empty or all the data have been transmitted.

In various embodiments, the communication interface 921 moreover takes into consideration the characteristics of the destination. For instance, in various embodiments, in the case where the destination is a memory 201, the size PS of a memory page in the aforesaid memory can moreover be specified.

Consequently, in various embodiments, the communication interface 921 interrupts or stops the transmission of the chunk also when the boundary or limit of one memory page is reached.

Figure 10:
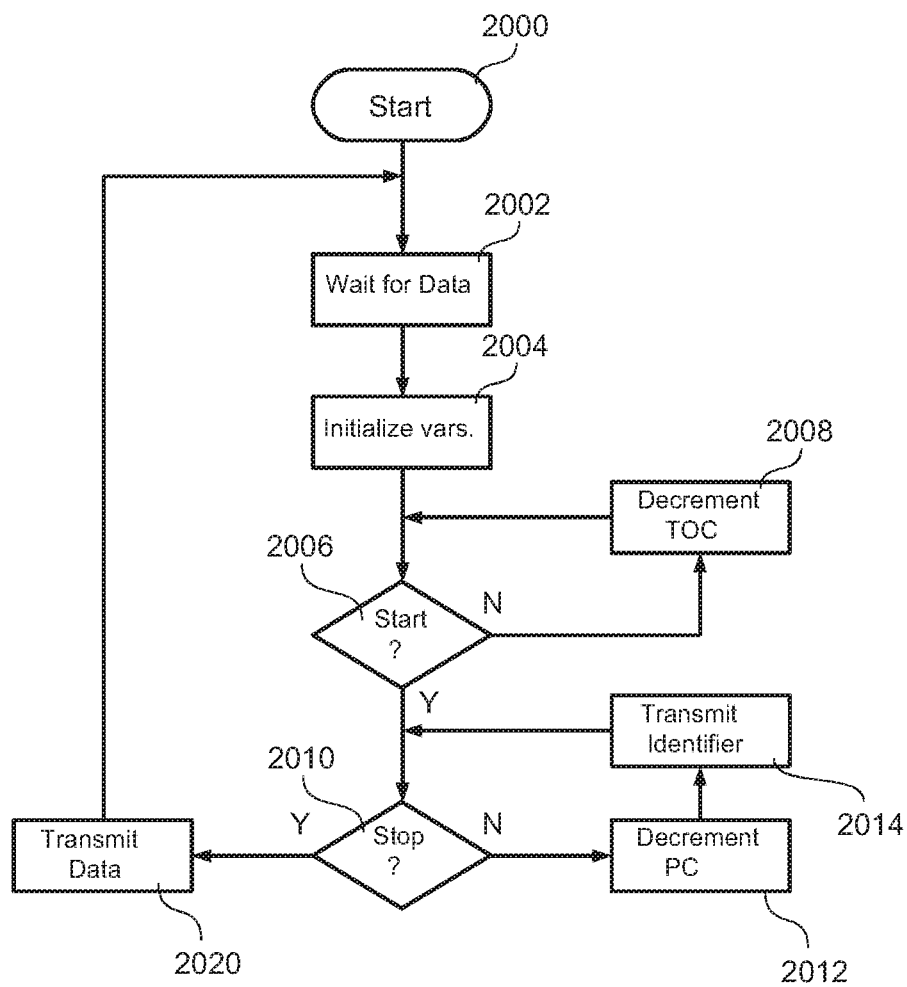

FIG. 10 shows a flowchart of a possible embodiment of a method that can be executed by the communication interface 921.

In particular, in the embodiment considered, it is assumed that the FIFO memory 922 is a "dual-port" memory, i.e., a memory in which writing of data in the memory can be performed simultaneously with reading of data from the memory.

Furthermore, FIG. 10 shows only the reading part, i.e., the part of generation of the chunk.

After an initial step 2000, the procedure waits in a step 2002 until at least one transmission segment in the memory 922 is available.

In a step 2004, the procedure initializes the main variables, such as for example a time counter TOC that is set on the time threshold TO and a data counter PC that is set on the number of datums requested for transmission, for example the number of data segments CS requested for transmission.

In a step 2006, the procedure verifies whether one of the conditions for starting generation of the chunk are satisfied. For instance, the procedure can verify whether:

a) the time threshold has been reached, for example the time counter TOC is equal to zero; and/or b) the data threshold THR has been reached, i.e., filling of the FIFO memory 922 is equal to or greater than the data threshold THR.

In various embodiments, the data threshold THR is set on a value that is less than the number of data CS in such a way that generation of the chunk is set under way also when not all the transmission segments of the chunk have yet been received.

In the case where none of the conditions for starting generation of the chunk is satisfied (output "NO" from the verification step 2006), the procedure decrements in a step 2008 the value of the time counter TOC, i.e., TOC=TOC−1, and returns to step 2006. The person skilled in the art will appreciate that, instead of initializing the counter TOC on the value of the time threshold TO and decrementing the counter until the zero value is reached, the aforesaid counter TOC could be set initially at zero and be incremented until it reaches the time threshold TO.

Instead, in the case where at least one of the conditions for starting generation of the chunk is satisfied (output "YES" from the verification step 2006), the procedure carries out a further verification step 2010.

In particular, in the embodiment considered, the procedure verifies, in step 2010, whether one of the conditions to stop generation of the chunks is satisfied. For instance, the procedure can verify whether:

a) all the transmission segments of the chunk have been transmitted, for example the data counter PC is equal to one;

b) in the case where the destination is a memory 20, a limit of a memory page has been reached; and/or c) the FIFO memory 922 does not contain other data; for example, it contains only one data segment that is still to be transmitted.

For instance, the condition b) can be verified by determining the memory address at which the data of the current transmission segment is to be written, and by comparing the aforesaid memory address with the limits of the memory pages of the target memory.

In the case where none of the conditions of stopping the generation of the chunk is satisfied (output "NO" from the verification step 2010), in step 1012, the procedure decrements by one the data counter PC, i.e., PC=PC−1, and transmits the next data segment in a step 2014. Next, the procedure returns to step 2010. The person skilled in the art will appreciate that also the data counter PC could be incremented until the number of transmission segments CS is reached.

In particular, in various embodiments, the data segment that is transmitted in step 2014 comprises an identifier, which signals that the transmission segment belongs to a chunk and that the transmission segment is not the last one of the chunk. For instance, in various embodiments, the procedure sets a flag (such as a dedicated signal or a field in the header of the transmission segment) at a first logic value, for example the logic value "1", and sends the data segment together with the aforesaid flag.

Instead, in the case where at least one of the conditions of stopping the generation of the chunk is satisfied (output "YES" from the verification step 2010), the procedure transmits the next data segment in a step 2020 and the method returns to step 2002.

In particular, in various embodiments, the data segment that is transmitted in step 2020 comprises an identifier, which signals that the transmission segment belongs to a chunk and that the transmission segment is the last one of the chunk. For instance, in various embodiments, the method sets the above-mentioned flag to a second logic value, for example the logic value "0", and sends the data segment together with the aforesaid flag.

As mentioned previously, the communication interfaces of the present description enable specification of a plurality of control parameters that regulate the conditions of start and arrest of generation of a chunk.

The above parameters should be set on the basis of the specific requests of the application, for example to reduce the latency of the transmission and the size of the FIFO memory 922.

Hereinafter, some examples will be described that enable determination of the parameters for configuration of the communication interface 921.

In general, the number of transmission segments AP that are stored in the FIFO memory after n clock cycles is substantially:

$$AP(n)=BIn \cdot (TO+n)-CLink \cdot n \quad (1)$$

where BIn is the bandwidth for writing in the memory 922, and CLink is the capacity of the link towards the interconnection network 701 that should correspond also to the bandwidth for reading from the memory 922.

Considering that the aforesaid number of datums should be equal to zero for the time of generation of the chunk GT, i.e., AP(GT)=0, and considering that the time GT corresponds to the ratio between the size of the chunk CS and the link capacity CLink, i.e., GT=CS/CLink, Eq. (1) may be rewritten as follows $$TO = \frac{CLink - BIn}{BIn} \cdot \frac{CS}{CLink} \quad (2)$$

Consequently, Eq. (2) can be used for determining the time threshold TO.

Knowing the time threshold TO also the data threshold THR can be determined as follows $$THR=BIn \cdot TO \quad (3)$$

Consequently, in the case where the bandwidth BIn were to correspond to the link capacity CLink, a FIFO memory 922 would not be necessary. However, this condition is sometimes not satisfied.

Figure 11:
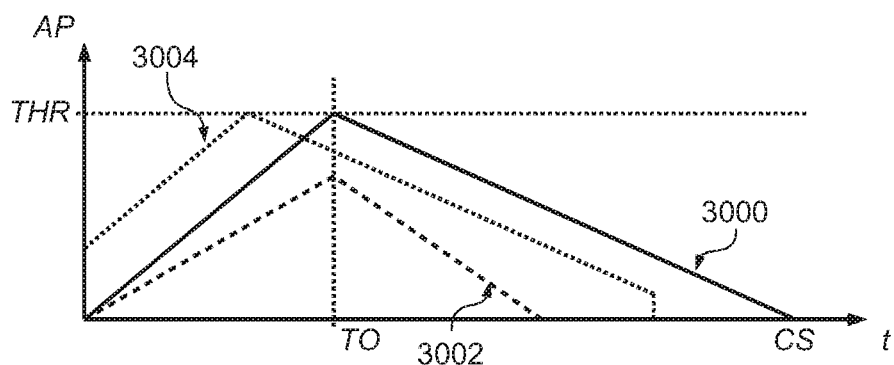

FIG. 11 illustrates some examples of operation of the communication interface described previously, which shows different numbers of segments AP in relation to the time t.

In particular, the line 3000 shows the desired scenario, where the memory 922 is initially empty and the transmission circuit 901 sends data segments with the bandwidth BIn. In this condition the aggregation time is exactly TO, and all the transmission segments are sent, i.e., the number of transmission segments sent is equal to CS.

Instead, the line 3002 shows a scenario where the memory 922 is initially empty and the transmission circuit 901 sends data segments with a bandwidth that is less than BIn. In this condition, the transmission of the chunk is in any case set under way at time TO, but fewer transmission segments are sent; i.e., the number of transmission segments sent is less than CS.

Finally, the line 3004 shows a scenario where the memory 922 initially contains data and the transmission circuit 901 sends data segments with a bandwidth that is equal to BIn. In this condition, the transmission of the chunk is set under way when the data threshold THR is reached. In this case, generation of the chunk is interrupted in advance in the temporal sense, i.e., the chunk is completed before the time normally envisaged, but in any case is generated entirely (size CS). Hence, at the end of generation, the FIFO still contains data.

By comparing the solutions described herein with the classic S&F approach, where the latency is CS/BIn, the ratio of the reduction RF is $$RF = \frac{CLink}{CLink - BIn} = \frac{1}{1-R}, \text{ with } R = \frac{BIn}{CLink} \quad (4)$$

Figure 12:
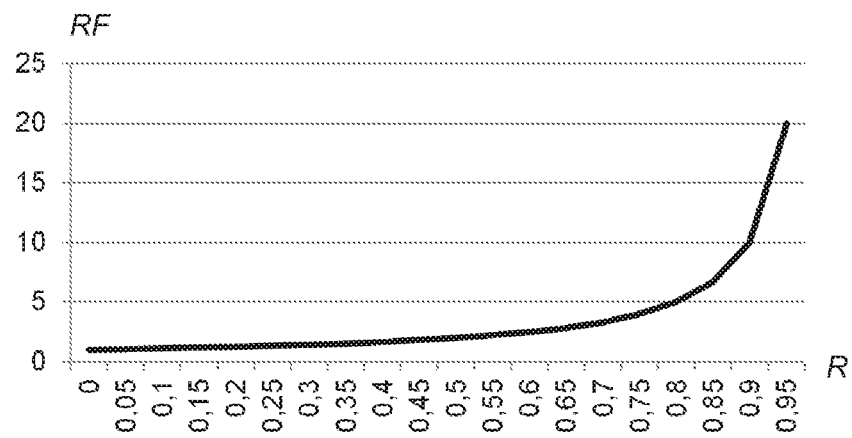

The aforesaid relation is illustrated in FIG. 12 that illustrates that already for small differences of the writing bandwidth BIn with respect to the width of the link CLink, a considerable improvement of the latency can be obtained, for example a gain of five for a bandwidth BIn that is 70%-80% the capacity of the link CLink.

Of course, without prejudice to the principle of the invention, the details of construction and the embodiments may vary widely with respect to what has been described and illustrated herein purely by way of example, without thereby departing from the scope of the present invention, as defined in the ensuing claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit, comprising:
   a plurality of transmission circuits;
   an interconnection network; and
   a communication interface coupling the plurality of transmission circuits with the interconnection network, the communication interface being configured to:
      receive transmission segments from a first transmission circuit of the plurality of transmission circuits, the transmission segments being directed to a memory address in the interconnection network;
      store the transmission segments as one or more data segments in a memory of the communication interface; and
      transmit the one or more data segments to the interconnection network in a manner that avoids interleaving the one or more data segments corresponding to the transmission segments from the first transmission circuit with data segments corresponding to transmission segments from other transmission circuits.

2. The integrated circuit according to claim 1, wherein the communication interface is configured to retrieve an identifier from at least one transmission segment of the transmission segments received from the first transmission circuit, the identifier being arranged to signal the interconnection network to avoid interleaving said data segments.

3. The integrated circuit according to claim 1, wherein the communication interface is configured to:
   receive a write request from the first transmission circuit, the write request being arranged to direct a transmission of a predetermined amount of data; and
   start transmitting the data segments stored in the memory when the memory contains the predetermined amount of data; or
   start transmitting the data segments when the memory contains less than the predetermined amount of data and when a first elapsed time since the write request was received from said transmission circuit exceeds a time threshold or when a second elapsed time since a first datum was received from the transmission circuit exceeds the time threshold; or
   start transmitting the data segments stored in the memory when the memory contains an amount of data greater than a data threshold.

4. The integrated circuit according to claim 3, wherein the communication interface is configured to:
   determine how much data has been transmitted; and
   stop transmission of the data segments stored in the memory when the amount of data transmitted is equal to the predetermined amount of data; or
   stop transmission of said data stored in the memory when the amount of data transmitted is less than the predetermined amount of data and when the memory does not contain other data.

5. The integrated circuit according to claim 1, wherein the plurality of transmission circuits are arranged to manipulate control signals associated with the memory and write data directly to the memory.

6. The integrated circuit according to claim 1, wherein the memory includes at least two first-in-first-out (FIFO) memories.

7. The integrated circuit according to claim 1, wherein said communication interface is configured to:
   determine how much data has been transmitted;
   verify whether the amount of data transmitted is equal to a predetermined amount of data;
   based on the verification that the amount of data transmitted is equal to the predetermined amount of data, stop transmission of said one or more data segments stored in said memory;
   based on the verification that the amount of data transmitted is less than said predetermined amount of data, verify whether said memory contains other data; and
   based on the verification that said memory does not contain other data, stop transmission of said one or more data segments stored in said memory.

8. A communication interface configured to couple a plurality of transmission circuits with an interconnection network, the communication interface comprising:
   a control circuit coupleable to the transmission circuit; and
   at least one memory, the communication interface being configured to:
      receive transmission segments from a first transmission circuit of the plurality of transmission circuits, the transmission segments being directed to a memory address in the interconnection network;
      store the transmission segments as one or more data segments in the at least one memory of the communication interface; and
      transmit the one or more data segments to the interconnection network in a manner that avoids interleaving the one or more data segments corresponding to the transmission segments from the first transmission circuit with data segments corresponding to transmission segments from other transmission circuits.

9. The communication interface according to claim 8, wherein the communication interface is configured to provide an identifier to the one or more data segments, the identifier being arranged to signal the interconnection network to avoid interleaving the one or more data segments with data segments corresponding to transmission segments from other transmission circuits.

10. The communication interface according to claim 8, wherein the communication interface is configured to:
receive a write request from the first transmission circuit, the write request being arranged to direct a transmission of a predetermined amount of data; and
start transmitting the data segments stored in the at least one memory based on an occurrence of a condition as follows:
when the at least one memory contains the predetermined amount of data;
when the at least one memory contains less than the predetermined amount of data and a first elapsed time since the write request was received from said transmission circuit exceeds a time threshold or a second elapsed time since a first datum was received from the transmission circuit exceeds the time threshold; or
when the at least one memory contains an amount of data greater than a data threshold.

11. The communication interface according to claim 10, wherein the communication interface is configured to:
determine how much data has been transmitted; and
stop transmission of the data segments stored in the at least one memory when the amount of data transmitted is equal to the predetermined amount of data; or
stop transmission of said data stored in the memory when the amount of data transmitted is less than the predetermined amount of data and when the at least one memory does not contain other data.

12. The communication interface according to claim 8, wherein the at least one memory is configured to be written to directly by the plurality of transmission circuits.

13. The communication interface according to claim 8, wherein the at least one memory includes at least two first-in-first-out (FIFO) memories.

14. The communication interface according to claim 8, wherein said communication interface is configured to:
determine how much data has been transmitted;
verify whether the amount of data transmitted is equal to a predetermined amount of data;
based on the verification that the amount of data transmitted is equal to the predetermined amount of data, stop transmission of said one or more data segments stored in said at least one memory;
based on the verification that the amount of data transmitted is less than said predetermined amount of data, verify whether said at least one memory contains other data; and
based on the verification that said at least one memory does not contain other data, stop transmission of said one or more data segments stored in said at least one memory.

15. A method, comprising:
receiving transmission segments from a first transmission circuit of a plurality of transmission circuits, the transmission segments being directed to a memory address in an interconnection network;
storing the transmission segments as one or more data segments in at least one memory of a communication interface; and
transmitting the one or more data segments to the interconnection network in a manner that avoids interleaving the one or more data segments corresponding to the transmission segments from the first transmission circuit with data segments corresponding to transmission segments from other transmission circuits.

16. The method according to claim 15, wherein the communication interface provides an identifier to the one or more data segments, the identifier being arranged to signal the interconnection network to avoid interleaving the one or more data segments with data segments corresponding to transmission segments from other transmission circuits.

17. The method according to claim 15, comprising:
receiving a write request from the first transmission circuit, the write request being arranged to direct a transmission of a predetermined amount of data; and
starting transmitting the data segments stored in the at least one memory based on an occurrence of a condition as follows:
when the at least one memory contains the predetermined amount of data;
when the at least one memory contains less than the predetermined amount of data and a first elapsed time since the write request was received from said transmission circuit exceeds a time threshold or a second elapsed time since a first datum was received from the transmission circuit exceeds the time threshold; or
when the at least one memory contains an amount of data greater than a data threshold.

18. The method according to claim 17, comprising:
determining how much data has been transmitted; and
stopping transmission of the data segments stored in the at least one memory when the amount of data transmitted is equal to the predetermined amount of data; or
stopping transmission of said data stored in the memory when the amount of data transmitted is less than the predetermined amount of data and when the at least one memory does not contain other data.

19. The method according to claim 15, wherein the receiving and storing include the first processing circuit writing the one or more data segments directly into the at least one memory.

20. The method according to claim 15, comprising:
determining how much data has been transmitted;
verifying whether the amount of data transmitted is equal to a predetermined amount of data;
based on the verifying that the amount of data transmitted is equal to the predetermined amount of data, stopping transmission of said one or more data segments stored in said at least one memory;
based on the verifying that the amount of data transmitted is less than said predetermined amount of data, verifying whether said at least one memory contains other data; and
based on the verifying that said at least one memory does not contain other data, stopping transmission of said one or more data segments stored in said at least one memory.

* * * * *